US006052696A

United States Patent [19]
Euler et al.

[11] Patent Number: 6,052,696
[45] Date of Patent: Apr. 18, 2000

[54] ADAPTIVE TIME-BASED JOURNAL BUNDLING

[75] Inventors: Theresa Renee Euler, Oronoco; Gary Ross Ricard, Chatfield; Timothy Joseph Torzewski, Rochester, all of Minn.

[73] Assignee: International Business Machines Corporation, Armonk, N.Y.

[21] Appl. No.: 09/067,536

[22] Filed: Apr. 27, 1998

[51] Int. Cl.[7] .................................................. G06F 17/30
[52] U.S. Cl. ............................................ 707/202; 714/15
[58] Field of Search ............................... 707/202; 714/15

[56] References Cited

U.S. PATENT DOCUMENTS

| | | | |
|---|---|---|---|
| 4,159,517 | 6/1979 | Paradine et al. | 710/57 |
| 4,507,751 | 3/1985 | Gawlick et al. | 707/202 |
| 4,819,156 | 4/1989 | DeLorme et al. | 714/15 |
| 5,386,554 | 1/1995 | Nozaki | 707/202 |
| 5,544,359 | 8/1996 | Tada et al. | 707/202 |
| 5,561,798 | 10/1996 | Haderle et al. | 707/202 |
| 5,574,897 | 11/1996 | Hermsmeier et al. | 707/1 |
| 5,956,504 | 9/1999 | Jagadish et al. | 707/101 |

OTHER PUBLICATIONS

Haerder et al, "Principles of Transaction–Oriented Database Recovery", Computing Surveys, vol. 15, No. 4, Dec. 1983, pp. 287–317.

*Primary Examiner*—Thomas G. Black
*Assistant Examiner*—William Trinh
*Attorney, Agent, or Firm*—Owen J. Gamon

[57] ABSTRACT

A method and system of journal bundling that provides improved performance. In the preferred embodiment, a journal controller starts a timer to expire at a predetermined maximum time-to-wait. The journal controller then accumulates journal records in a bundle and transmits the bundle to the journal. The journal controller determines the number-of-journal-records accumulated in the bundle based on an adjustable preferred-bundle-size, which it calculates from an average-bundle-size over a history interval. If the timer expires, the journal controller writes the bundle to the journal even if the preferred-bundle-size has not been reached. By basing the preferred-bundle-size on an average-bundle-size over a history interval, the journal controller prevents rapid changes in the journal traffic-rate, which increases journal performance.

27 Claims, 7 Drawing Sheets

ADAPTIVE TIME-BASED JOURNAL BUNDLING

FIELD OF THE INVENTION

This invention relates to the data processing field. More particularly, this invention relates to a method and apparatus for adaptively bundling journal records.

BACKGROUND

Computer systems often provide a database management-system that manages the creation, deletion, and modification of records stored in a database. Such database management-systems must maintain the integrity of the database in spite of the possibility of (1) failure of the media upon which the database is recorded, (2) failure of the computer system in which the database management system is operating, or (3) failure of database transactions to successfully complete processing. These failures may be the result of hardware problems, software problems, or even the result of a complete loss of power to the computer system's main memory. Because main memory is generally volatile and requires power to maintain its stored information, such a power loss will result in loss of knowledge by the computer system as to changes being made to the database. In order to recover from such failures, prior database management-systems provided a journal of changes made to the database. Such a journal is stored in non-volatile storage devices, such as magnetic tape or disk.

A database management-system with journaling has slower performance than one without journaling because of the extra journal processing. When journaling, not only is the database-management system updating the database with a transaction, but it is also sending a journal record that describes the transaction to a journal controller for writing into the journal in non-volatile storage or in a remote computer system.

A method to increase journaling performance is to write journal records in a bundle to non-volatile storage. This bundling method consolidates individual records into a group, called a bundle, which reduces the overhead when compared to processing the same number of journal records individually because the journal controller and non-volatile storage can process the entire bundle at once. Just as it is more efficient to make one trip carrying a bundle of multiple sticks than it is to make multiple trips with individual sticks, it is more efficient to write one bundle of records to non-volatile storage simultaneously than it is to write multiple records at different times.

In a typical bundling method, a journal controller will accumulate journal records until the bundle reaches a fixed target-length. The journal controller then writes the entire bundle to non-volatile storage at once. Since the journal-record arrival-rate at the journal controller may be unpredictable, to ensure that the accumulated journal records are handled in a timely manner, the method typically starts a timer when the journal controller receives the first record in a bundle. When the timer expires, the journal controller will conclude the bundle and write it even if the bundle has not yet reached its target length.

This bundling method works well when the journal-record traffic-rate is high because the timer never expires. But when the journal-record traffic-rate is low, the records that the journal controller does receive experience poor performance while waiting in vain for additional journal-records to accumulate, and the ultimate timer expiration introduces additional processing overhead. Thus, the problem is that the target-length of the bundles is fixed while the journal-record traffic-rate is variable.

Another bundling method uses a variable bundle-size in an attempt to overcome the problems of fixed-length bundles. This method sets an arbitrary, initial optimum bundle-size and an optimum time. The optimum time is a predetermined, reasonable, waiting time for the bundle to be filled. When either the optimum bundle-size or the optimum time is reached, the contents of the bundle are transferred to non-volatile storage. If the optimum time is reached before the optimum bundle-size, then the optimum bundle-size is decreased and if vice versa, then the optimum bundle-size is increased. An example of this variable bundle-size method is illustrated in U.S. Pat. No. 4,159,517.

In another variable bundle-size method, the journal controller accumulates journal records until no database management-system processes are waiting to deposit records into the journal. The journal controller will then write the entire bundle at once. Here again, the method starts a timer when the journal controller receives the first record in a bundle, and when the timer expires, the journal controller concludes the bundle and processes it.

These variable bundle-size methods suffer from the problem that when the journal-record traffic is variable, the optimum bundle-size tends to oscillate between a large and a small size, which wastes processor and storage resources and thus degrades performance. A large optimum bundle-size will degrade performance of subsequent journal records when the journal-record traffic-rate subsequently decreases, and a small optimum bundle-size will degrade performance for subsequent journal records by causing the issuance of too many non-volatile storage write-operations when the journal-record traffic-rate subsequently increases. Thus, these variable bundle-size methods respond too rapidly to changes in the journal-record traffic-rate.

Therefore, there is a need for journal bundling that will overcome the disadvantages of the prior art and provide improved performance even in times of a light, variable, or unpredictable journal-record traffic rate.

SUMMARY OF THE INVENTION

The invention is a method and system of journal bundling that provides improved performance. In the preferred embodiment, a journal controller starts a timer to expire at a predetermined maximum time-to-wait. The journal controller then accumulates journal records in a bundle and transmits the bundle to the journal. The journal controller determines the number-of-journal-records accumulated in the bundle based on an adjustable preferred-bundle-size, which it calculates from an average-bundle-size over a history interval. If the timer expires, the journal controller writes the bundle to the journal even if the preferred-bundle-size has not been reached. By basing the preferred-bundle-size on an average-bundle-size over a history interval, the journal controller prevents rapid changes in the journal traffic-rate, which increases journal performance.

DESCRIPTION OF THE PREFERRED EMBODIMENT

Technology Overview

Figure 1:
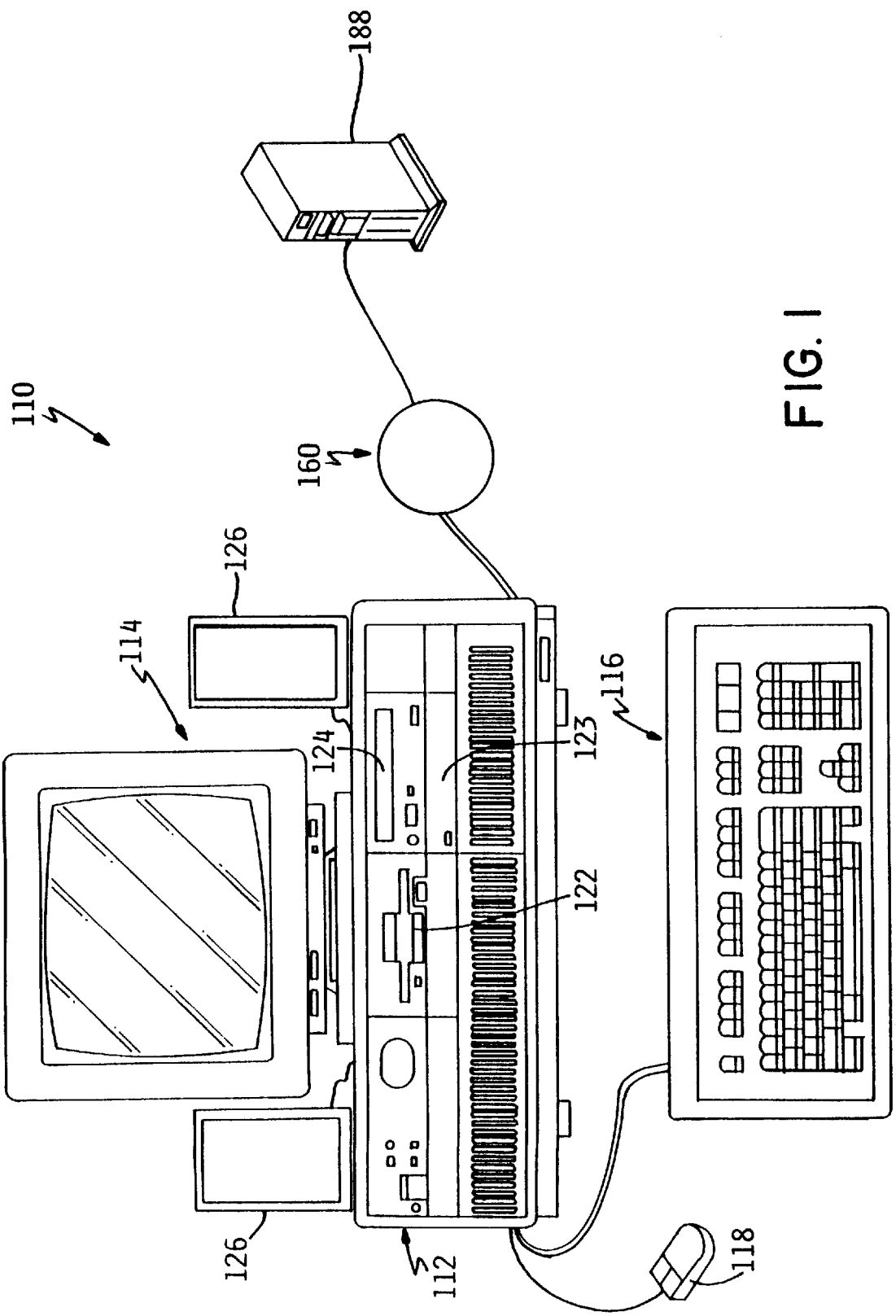
FIG. 1 depicts a pictorial representation of a network of exemplary computer systems that may be used to implement a preferred embodiment.

In the operation of computer systems, it is the practice to provide a database-management system that manages the creation, deletion, and modification of records stored in a database. Such database management-systems must maintain the integrity of the database in spite of the possibility of (1) failure of the media upon which the database is recorded, (2) failure of the computer system in which the database management system is operating, or (3) failure of one or more of the database transactions to successfully complete its processing. These failures may be the result of hardware problems, software problems, or may even be the result of a complete loss of power to the computer system's main memory. Because main memory is generally volatile and requires power to maintain the information stored within it, such a power loss will result in loss of knowledge by the computer system as to its own state, the state of processes under its control, and information with respect to chances being made to the database.

In order to recover from such failures, database management-systems provide a journal of changes made to the database, of messages, and of persistent system states. Such a journal is stored in either volatile main-memory buffers or non-volatile storage devices, such as magnetic tape or disks. Initially, the data may be stored in volatile buffers because these are directly addressable by the processor. But, only data stored in non-volatile storage blocks is persistent. Thus, when process epochs (such as synchronization or commit points) occur that assume that journal data will persist, the data in buffers must be transferred to non-volatile storage.

A database management-system with journaling is typically very slow as compared to a database management-system without journaling. This is because of all of the extra journal processing. Not only is the database management-system updating the database with a transaction, but it is also sending a journal record that describes the transaction to a journal controller for writing onto non-volatile storage or to a remote computer system. The journal record typically contains an identifier of the issuer of the transaction (a program, workstation, or user); a time and date of the transaction; a unique identifier issued by the database-management system for the transaction; the exact transaction as issued; and the address of all the data affected as well as the copy of its value just before and just after the change. The journal controller processes this information and writes it to a journal.

A way to increase journaling performance is a method, called bundling, that writes journal records in a bundle to non-volatile storage. This bundling method consolidates individual records into a group, called a bundle, which reduces the overhead when compared to processing the same number of journal records individually because the journal controller and non-volatile storage can process the entire bundle of journal records at once. Just as it is more efficient to make one trip carrying a bundle of multiple sticks than it is to make multiple trips with individual sticks, it is more efficient to write one bundle of records to non-volatile storage simultaneously than it is to write multiple records at different times.

Detailed Description

With reference now to the figures and in particular with reference to FIG. 1, there is depicted an embodiment of a network of a computer system that can be utilized to implement the preferred embodiment. Computer system 110 is connected to remote computer system 188 via network 160. Computer system 110 includes processing unit 112, display device 114, keyboard 116, pointing device 118, and speakers 126. Processing unit 112 receives input data from input devices such as keyboard 116, pointing device 118, and network 160 and presents output data to a user via display device 114 and speakers 126. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display terminal 114. Keyboard 116 includes a standard set of printable characters presented in a "QWERTY" pattern typical of most typewriters. In addition, keyboard 116 includes a calculator-like numeric keypad at one side. Some of these keys, such as the "control", "alt", and "shift" keys can be utilized to change the meaning of another key. Other special keys and combinations of keys can be utilized to control program operations or to move either text or cursor on the display screen of video display terminal 114.

Video-display terminal 114 is the visual output of computer system 110. As indicated herein, video-display terminal 114 can be a cathode-ray tube (CRT) based video display well-known in the art of computer hardware. But, with a portable or notebook-based computer, video display terminal 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112.

To support storage and retrieval of data, processing unit 112 further includes diskette drive 122, hard-disk drive 123, and tape drive 124, which are interconnected with other components of processing unit 112. Although diskette drive 122, hard-disk drive 123, and tape drive 124 are shown incorporated into system unit 112, they could be external to system unit 112, either connected directly, or on a local area network (LAN), on network 160, or attached to remote computer system 188.

Computer system 110 can be implemented utilizing any suitable computer such as the AS/400 computer system or IBM Aptiva computer, both products of International Business Machines Corporation, located in Armonk, N.Y. Computer system 110 is thus a configuration that includes all functional components of a computer and its associated hardware. In general, a typical computer system includes a console or processing unit such as processing unit 112, with one or more disk drives, a monitor such as video display terminal 114, and a keyboard such as keyboard 116. Remote computer system 188 can be implemented utilizing any suitable computer that contains non-volatile storage. But, a preferred embodiment of the present invention can apply to any hardware configuration that allows journaling of records, regardless of whether the computer system is a complicated, multi-user computing apparatus, a single-user workstation, or a network appliance that does not have non-volatile storage of its own.

Figure 2:
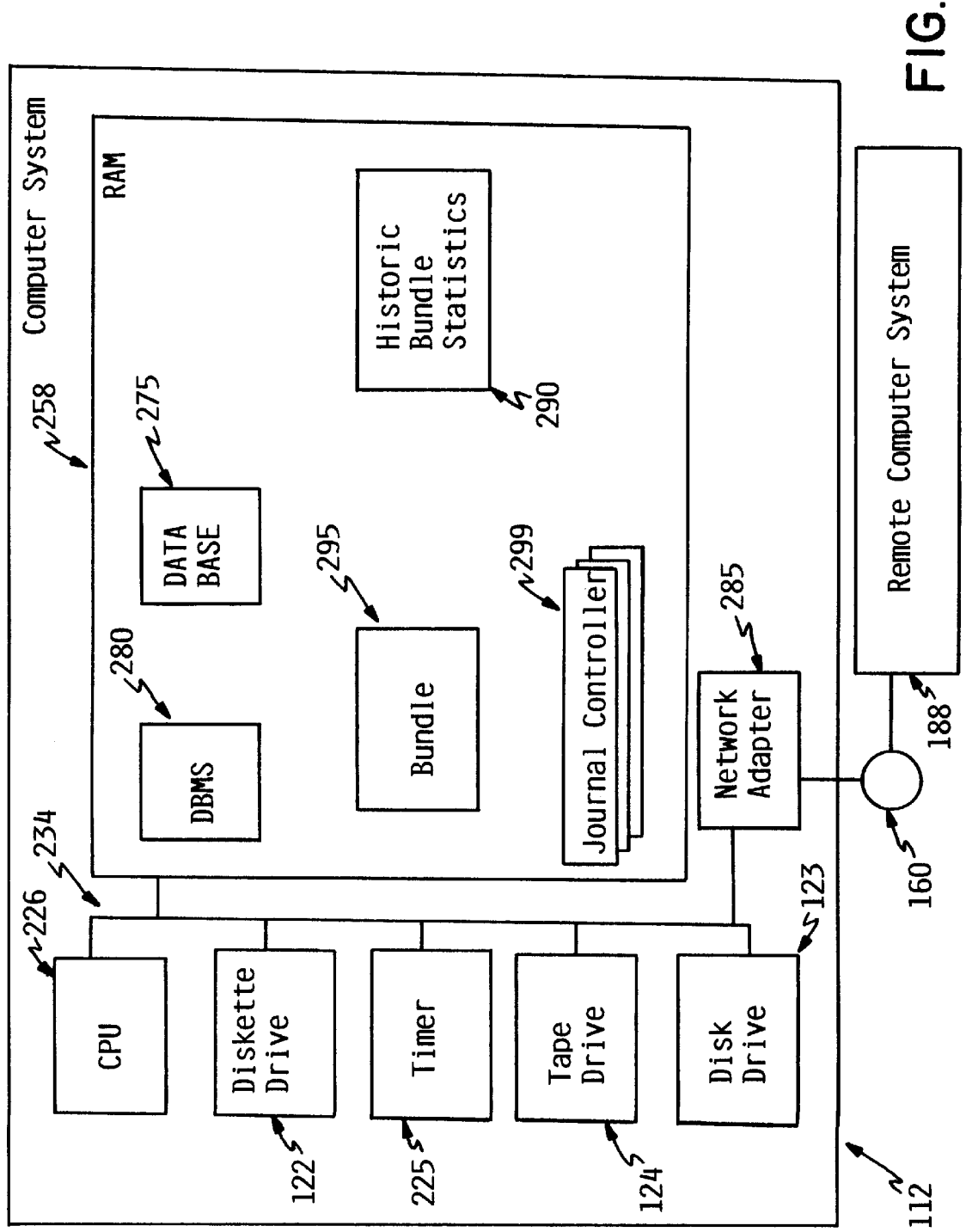
FIG. 2 depicts a block diagram of a system that bundles journal records, in accordance with a preferred embodiment.

Referring to FIG. 2, there is depicted a block diagram of the principal components of processing unit 112 attached via network 160 to remote computer system 188. CPU (central processing unit) 226 is connected via system bus 234 to RAM (Random Access Memory) 258, diskette drive 122, hard-disk drive 123, tape drive 124, timer 225, and network adapter 285. Although the various components of FIG. 2 are drawn as single entities, each may consist of a plurality of entities and may exist at multiple levels.

Processing unit 112 includes central processing unit (CPU) 226, which executes instructions. CPU 226 includes the portion of computer system 110 that controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 also generally includes an arithmetic unit that executes arithmetical and logical operations, such as addition, comparison, and multiplication. CPU 226 accesses data and instructions from and stores data to volatile RAM 258.

While any appropriate processor can be utilized for CPU 226, it is preferably one of the Power PC line of microprocessors available from IBM. Alternatively, (CPU 226 can be implemented as one of the 80X86 or Pentium processors, or any other type of processor, which are available from a number of vendors. Although processing unit 112 is shown to contain only a single CPU and a single system bus, the present invention applies equally to computer systems that have multiple CPUs and to computer systems that have multiple buses that each perform different functions in different ways.

RAM 258 comprises a number of individual, volatile-memory modules that store segments of operating system and application software while power is supplied to computer system 110. The software segments are partitioned into one or more virtual memory pages that each contain a uniform number of virtual memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without having to start from the beginning.

RAM 258 contains database management-system (DBMS) 280, database 275, bundle 295, historic bundle statistics 290, and journal controller 299. Journal controller 299 contains instructions capable of being executed by CPU 226. In the alternative, journal controller 299 could be implemented by control circuitry through the use of logic gates, programmed by logic devices, or other hardware components in lieu of a processor-based system. The operation of journal controller 299 is described below under the description for FIGS. 4 and 5.

Timer 225 is capable of interrupting software after expiration of a specified time. Timer 225 can be a register, such as a clock register or a time register. Setting a timer places a value in the register, and the register decrements the value with each instruction or cycle. An interrupt occurs when the register value reaches zero, which interrupts software instructions executing on CPU 226 after expiration of the specified time.

Hard disk drive 123 and diskette drive 122 are electro-mechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g., hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment.

Tape drive 124 is an electromechanical device that reads from and writes to tape media. The main components of a tape drive are spindles, on which the tape media is mounted, a drive motor that turns the spindles when the drive is in operation, one or more read/write heads that perform the actual reading and writing of data on the media, and controller circuitry that synchronizes read/write activities and transfers information to and from computer system 110. The tape media is typically a long, flat piece of flexible plastic coated with a magnetic material that can be electrically influenced to hold information recorded in digital form. The flexible plastic can be wound on multiple, separate reels or within a cartridge.

Finally, processing unit 112 includes network adapter 285, which facilitates communication between computer system 110 and a local area network (LAN) or network 160, which might be an intranet or the Internet. A LAN provides a user of computer systems 110 with a means of electronically communicating information, including software, with a remote computer or a network logical-storage device. In addition, a LAN supports distributed processing, which enables computer system 110 to share a task with other computer systems linked to the LAN.

Network adaptor 285 could also be a modem, which supports communication between computer system 110 and another computer system over a standard telephone line. Furthermore, through modem 287, computer system 110 can access other sources such as a server, an electronic bulletin board, and the Internet or World Wide Web.

Network 160 may include a plurality of networks, each of which could include a plurality of individual computers.

Network 160 and remote computer system 188 could be located a great geographic distance from computer system 110 or they could be in the same room or even on the same desktop. Computer system 110 could be connected to network 160 via a standard telephone line, a dedicated cable, or a wireless communications link.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted. Thus, a preferred embodiment of the present invention can apply to any hardware configuration that allows the bundling of records, regardless of whether the hardware configuration is a complicated, multi-user computing apparatus, a single-user workstation, or a network appliance that does not have non-volatile storage of its own.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks) readable by an unillustrated CD-ROM drive; (b) alterable information stored on writable storage media (e.g., floppy disks within diskette drive 122, tape drive 124, or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3A:
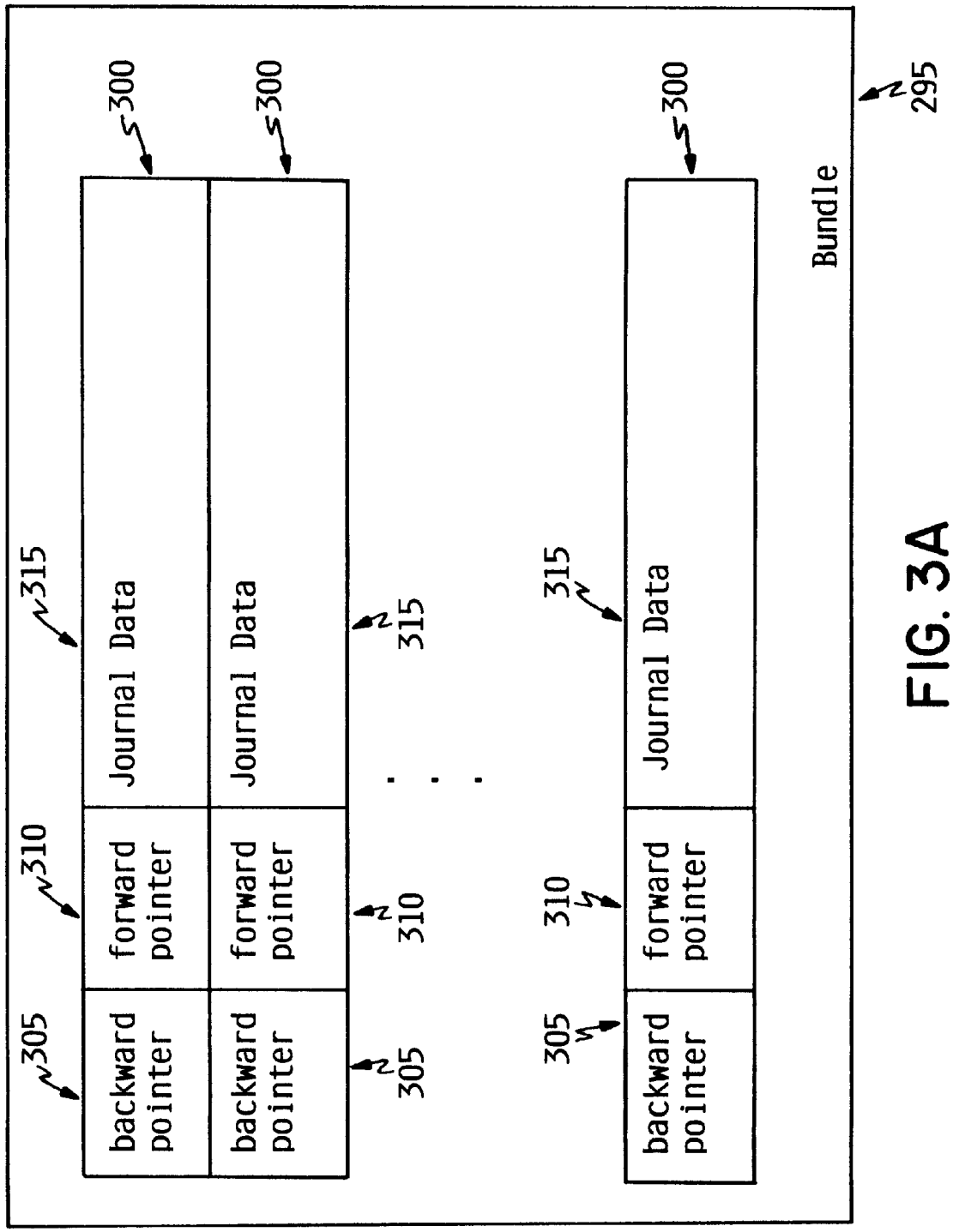
FIG. 3a depicts a block diagram of a data structure of an example bundle, in accordance with a preferred embodiment.

Referring to FIG. 3a, a block diagram of a data structure example of journal bundle 295, according to the preferred embodiment, is shown. Bundle 295 contains journal records 300, each of which contains backward pointer 305, forward pointer 310, and journal data 315. Backward pointer 305 and forward pointer 310 point to the previous and next journal records, respectively, in bundle 295. Journal data 315 is of variable length and can contain such information as the identification of the issuer of the transaction (program, workstation, or user); time and date of issue; a unique identifier issued by DBMS 280 for the transaction; the exact transaction as issued; and the address of all the data effected as well as a copy of its value just before and just after the change.

Figure 3B:
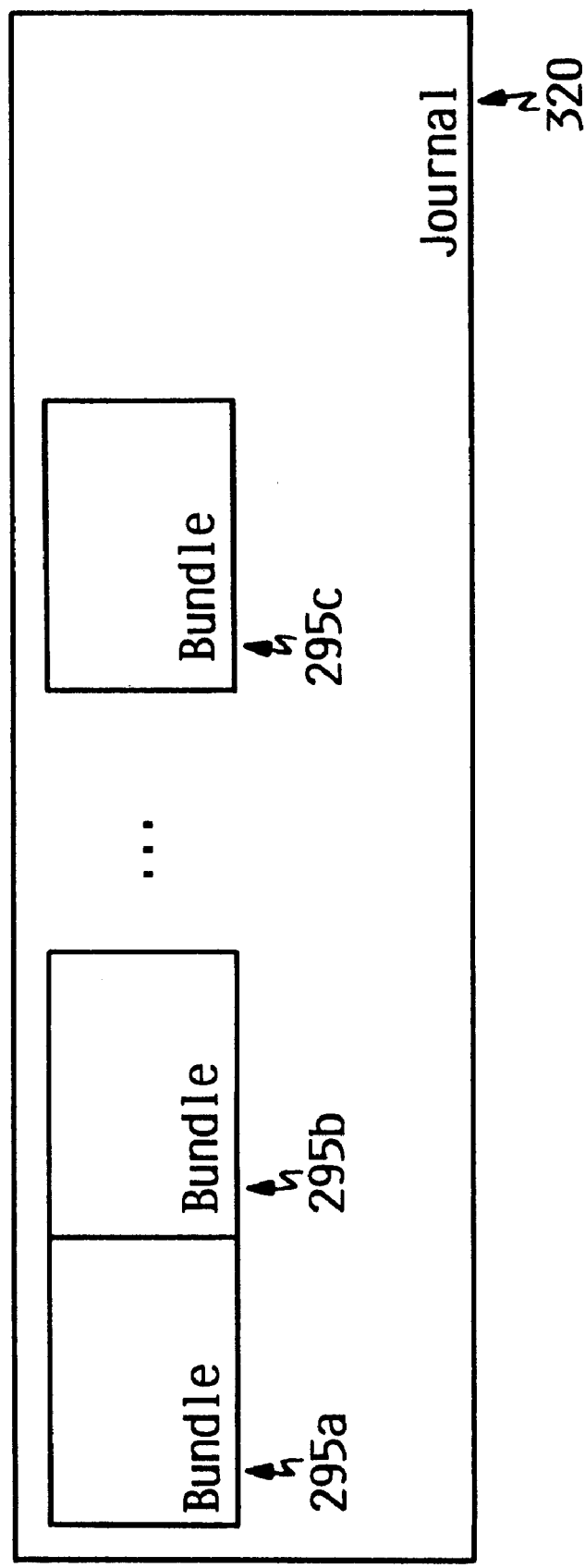
FIG. 3b depicts a block diagram of a data structure of an example journal, in accordance with a preferred embodiment.

Referring to FIG. 3b, a block diagram of a data structure example of journal 320, according to the preferred embodiment, is shown. Journal 320 contains bundles 295a, 295b, . . . 295c. Journal 320 could be contained in non-volatile storage, such as in diskette drive 122, disk drive 123, tape drive 124, or remote computer system 188.

Figure 4A:
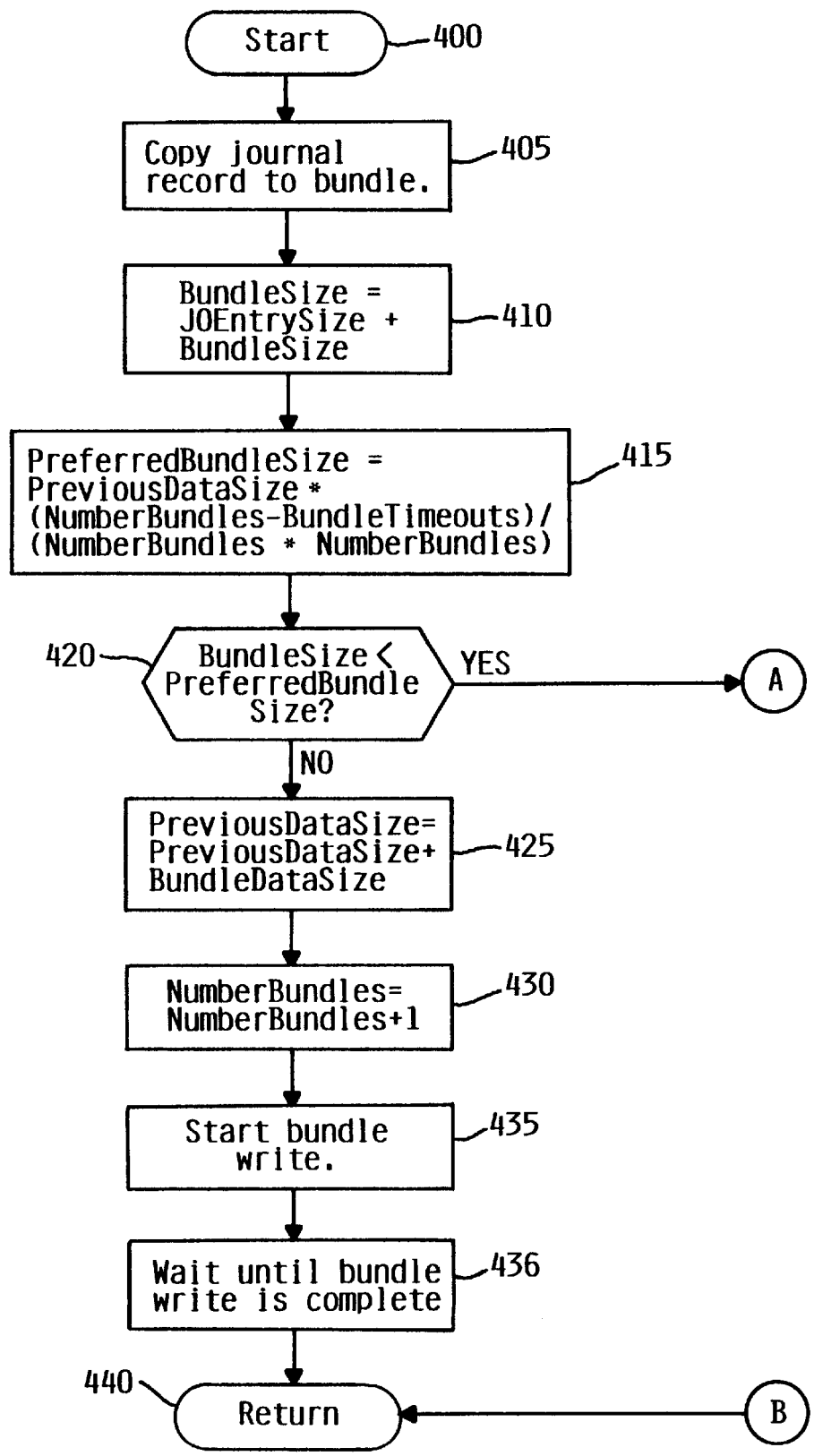
FIGS. 4 and 5 depict flowcharts that describe the operation of a preferred embodiment.
Figure 4B:
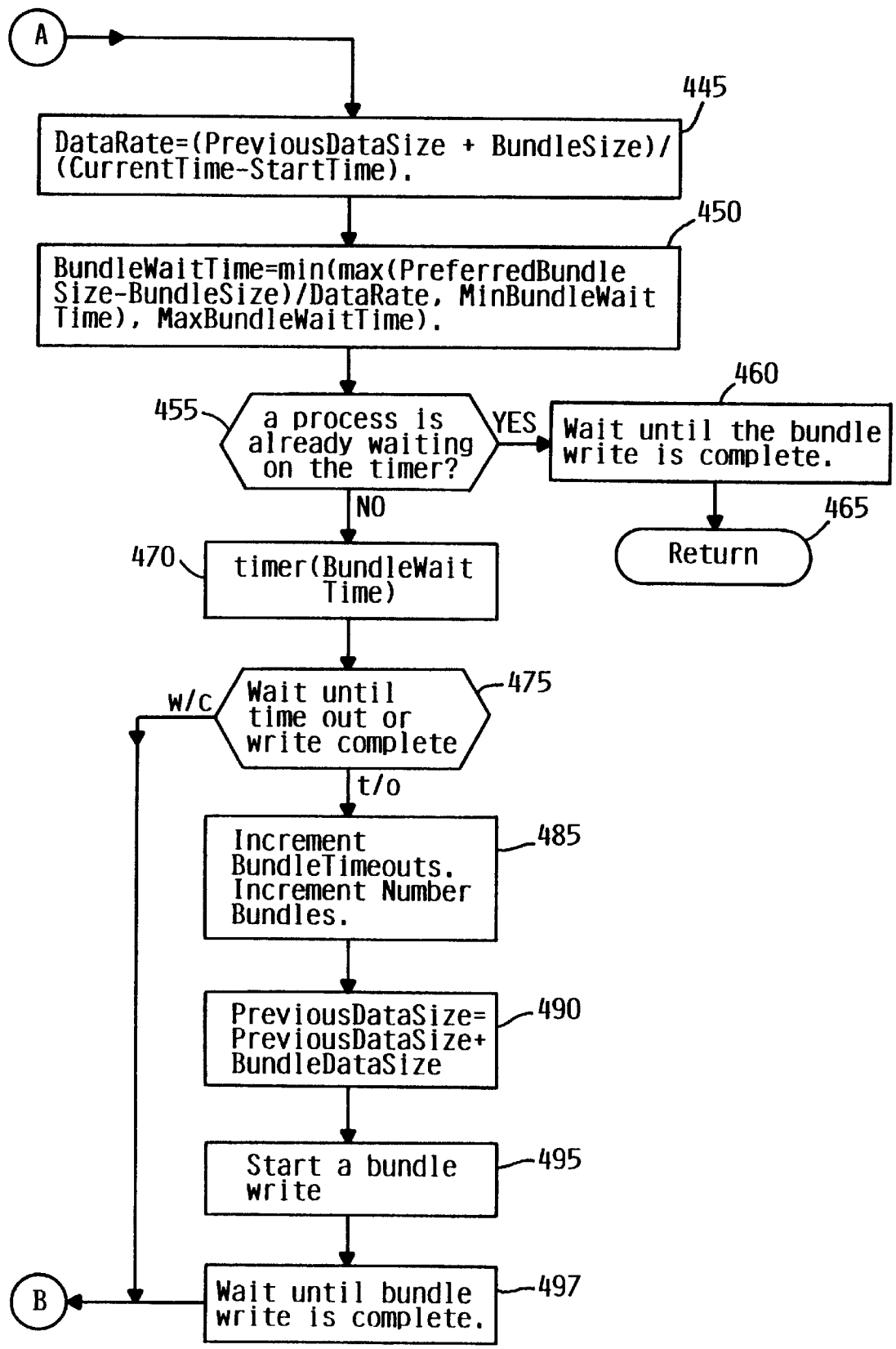
Figure 5:
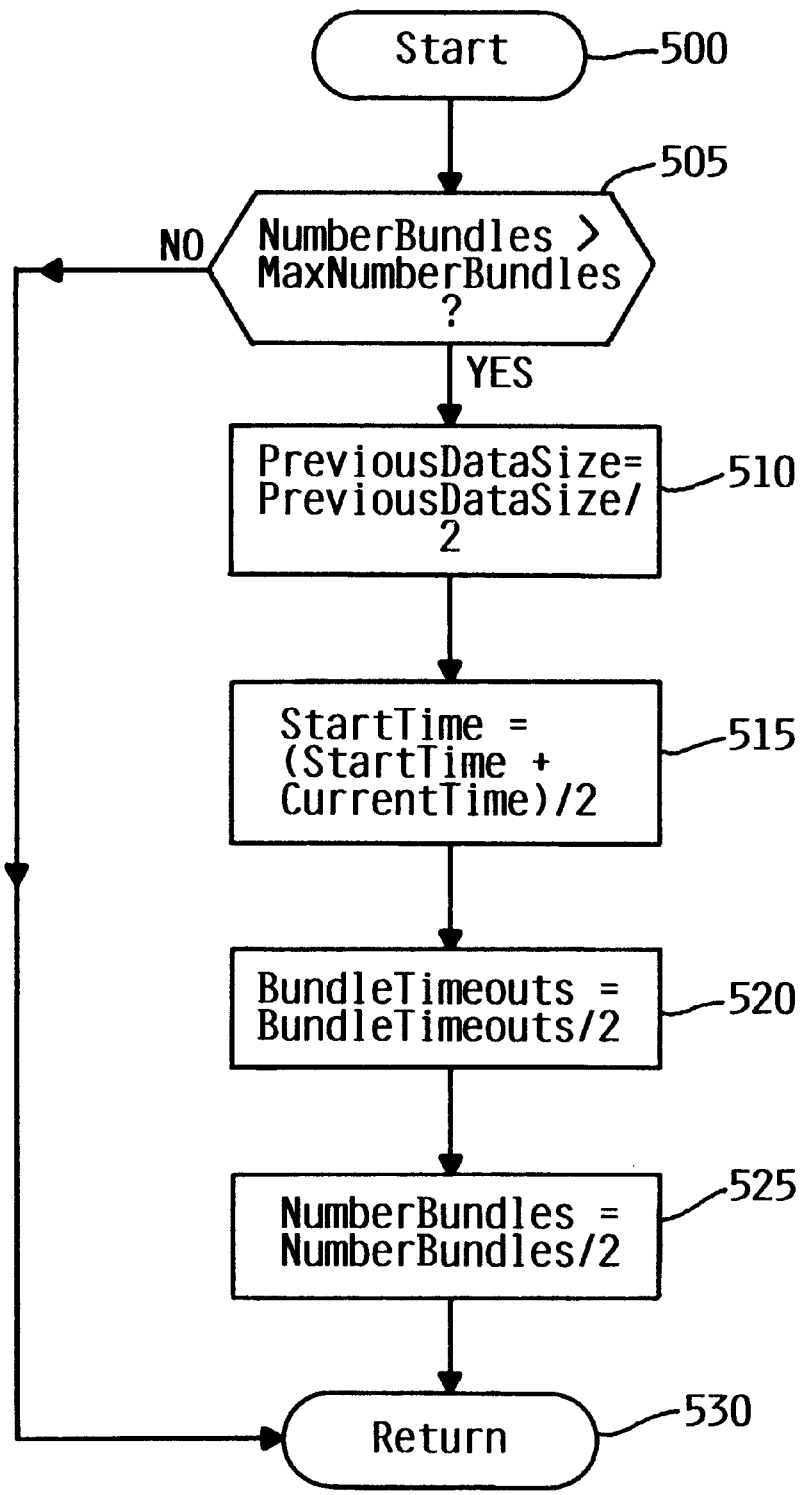

The operation of the preferred embodiment, as shown in the flowcharts of FIGS. 4 and 5, will now be described in more detail.

Referring to FIG. 4, example logic invoked when journal controller 299 receives a journal record from DBMS 280 is shown. At block 400, the logic is started. At block 405, journal controller 299 copies received journal-record 315 to bundle 295. Control then continues to block 410 where journal controller 299 sets the current bundle-size to be the journal-entry size plus the current bundle-size. The current bundle-size thus reflects the total amount-of-data in the current bundle.

Control then continues to block 415 where journal controller 299 sets the preferred bundle-size to be the previous data-size multiplied by (the number-of-bundles minus the number-of-bundle time-outs) divided by (the number-of-bundles multiplied by the number-of-bundles). The start time is the time at which the current bundle-history interval started, and is the time at which half of the data, in the preferred embodiment, in historic bundle-statistics 290 is discarded, as further described below under the description for FIG. 5. Referring again to FIG. 4, the current time is the time at which the current journal-entry was received. Thus, the start time and the current time bound the current history-interval. It is the keeping of data in stored bundled-statistics 290 that at prevents rapid changes in the journal traffic rate. The previous data-size is the amount of data deposited in journal 320 during the current history-interval adjusted by the amount of data deposited in previous intervals. The number-of-bundles is the total number-of-bundles in the current history-interval adjusted by the number-of-bundles deposited in previous intervals. The number-of-bundle time-outs is the number-of-timeouts during the current history-interval adjusted by the number-of-timeouts deposited during previous intervals. Previous interval data affects the current history interval in a manner inversely proportional to the amount of time since the previous data vias originally deposited, which is further described under the description for FIG. 5.

Thus, at block 415, journal controller 299 calculates the preferred bundle-size to be the average bundle-size of all data previously placed in journal 320 during the current history-interval adjusted downward in direct proportion to the number of time-outs that occurred while waiting for more journal records to arrive at journal controller 299. Note that the calculation described at block 415 will tend to minimize the time that a single process waits for an additional bundle write-operation, plus it acts as a damping mechanism to temper any large changes in wait time.

Control then continues to block 420 where journal controller 299 determines whether the current bundle-size is less than the preferred bundle-size. If the determination al block 420 is true, then control continues to block 445 where journal controller 299 sets the data rate to be (the previous data-size plus the current bundle size) divided by (the current time minus the start time of the bundle). Control then continues to block 450 where journal controller 299 calculates (the preferred bundle-size minus the current bundle-size) divided by the data rate, and then calculates the maximum of that value and the minimum bundle-wait-time, and then finds the minimum of that maximum and the maximum bundle-wait-time and sets the resulting value into the bundle wait-time.

Thus, at blocks 445 and 450, journal controller 299 has adjusted the wait time to be proportional to the remainder of the amount of data that should be in the current bundle. This time will vary based on how long the wait should be for enough data to fill the current bundle based on the previous data-rate to journal 320. The wait time is limited by a minimum and maximum value, which are predetermined constants: minimum bundle-wait-time and maximum bundle-wait-time, respectively.

Control then continues to block 455 where journal controller 299 determines whether another journal-controller process is already waiting on timer 225. Although, in the preferred embodiment, there is only one current bundle 295 and only one historic bundle statistics 290, there may be multiple journal-controller processes 299. A new journal controller process 299 is started for every journal data record 315 received from DBMS 280. If the determination of block 455 is true, then control continues to block 460 where journal controller 299 waits until the current bundle is written to journal 320. The process then returns at block 465. If the determination at block 455 is false, then control continues to block 470 where journal controller 299 starts a timer to wait for the time previously calculated at block 450. Control then continues to block 475 where journal controller 299 waits until either the timer timed out or a bundle write-operation completed.

If the timer timed out at block 475, then control continues to block 485 where journal controller 299 increments the number-of-bundle time-outs and increments the number-of-bundles. Control then continues to block 490 where journal controller 299 sets the previous data-size to be the previous data-size plus the current bundle-size. Thus, blocks 485 and 490 are updating data contained in stored bundle-statistics 290. Control then continues to block 495 where journal controller 299 starts a bundle write-operation to write the current bundle to journal 320. Control then continues to block 497 where journal controller 299 waits until the bundle write operation is complete. Control then continues to block 440 where the function returns.

If a bundle write operation completed at block 475, then control continues to block 440 where the function returns.

If the determination at block 420 is false, then control continues to block 425 where journal controller 299 increments the previous data-size by the bundle data-size. Control then continues to block 430 where journal controller 299 increments the number-of-bundles by one. Thus, the logic of blocks 425 and 430 is updating data in stored bundle statistics 290. Control then continues to block 435 where journal controller 299 starts a bundle write-operation. Control then continues to block 436 where journal controller 299 waits until the bundle write-operation is completed. Control then continues to block 440 where the function returns.

Referring to FIG. 5, there is illustrated sample logic that is executed periodically after a predetermined constant amount-of-time. Control starts at block 500. Control then continues to block 505 where journal controller 299 determines whether the current number-of-bundles is greater than the maximum number-of-bundles, which is a predetermined constant. If the determination of block 505 is true, then control continues to block 510 where journal controller 299 reduces the previous data-size by half.

Control then continues to block 515, where journal controller 299 sets the start time to be the start time plus the current time divided by two. Thus, at block 515 journal controller 299 is creating the start of a new history-interval.

Control then continues to block 520 where journal controller 299 reduces the bundle time-outs by half. Control then continues to block 525 where journal controller reduces the number-of-bundles by half. Control then continues to block 530 where the function returns.

If the determination of block 505 is false, then control continues directly to block 530 where the function returns.

Current number-of-bundles, previous data-size, start time, bundle time-outs, and number-of-bundles are all contained in historic bundle-statistics 290. Thus, according to the logic of FIG. 5, periodically journal controller 299 discards half of historic bundle-statistic 290. This eases the effect new bundles have on the preferred bundle-size and promotes no timer set-up or waits when the data rate to journal 320 does not vary dramatically.

Therefore, it is the keeping of data in historic bundle-statistics 290 that prevents rapid changes in the journal traffic-rate, as described above under the description for FIG. 4. The logic of FIG. 5 allows the preferred embodiment to increase the effect of new bundles, so that the preferred embodiment will slowly adapt to a new journal traffic-rate. Although, in the preferred embodiment, journal controller 299 periodically discards half of historic bundle-statistics 290, in an alternative embodiment journal controller 299 could discard any fraction of historic bundle-statistics 290 or none at all.

These foregoing concepts are illustrated by the following pseudo-code. The following historic bundle statistics are kept.

StartTime—Time at which the current bundle-history started.

CurrentTime—Time at which the current journal-entry was received.

PreviousDataSize—The amount of data deposited in the Journal during the current history-interval.

NumberBundles—The total number of bundles in the current history-interval.

BundleTimeouts—The number of timer timeouts in the current history-interval.

PreferredBundleSize—Average journal bundle-size (bytes/DASD I/O) over the history-interval.

DataRate—Rate at which data is being deposited on the journal in the current history-interval.

BundleWaitTime—Amount of time that should elapse while waiting for data to fill the current bundle to the PreferredBundleSize.

BundleSize—The current active bundle size.

JOEntrySize—The current journal entry size.

MinBundleWaitTime—The minimum time to wait for more journal entries to arrive. If a wail is needed, then a wait for a significant amount of time should be performed. There is no sense waiting for a time so minuscule that the overhead of setting up the timer is not warranted.

MaxBuridleWaitTime—The maximum time to wait for more journal entries to arrive. This value is chosen such that user response time remains reasonable.

```
/*Pseudo-code executed when a journal record is received by the journal controller*/
BundleSize+=JOEntrySize
PreferredBundleSize = PreviousDataSize*
    (NumberBundles-BundleTimeouts)/(NumberBundles*NumberBundles)
```

-continued

```
if BundleSize<PreferredBundleSize
   DataRate = (PreviousDataSize+BundleSize)/(CurrentTime-StartTime)
   BundleWaitTime=min(max((PreferredBundleSize-
   BundleSize)/DataRate,MinBundleWaitTime),MaxBundleWaitTime)
   If a process is already waiting on the timer then
      wait until the bundle is written
   else
      Start a timer to wait BundleWaitTime
      Wait for timer to time out or a write bundle operation to complete
      /* If the timer timed out the statistics used for adaptive bundling are
      calculated and an I/O is started */
      If timer timed out
         ++BundleTimeouts
         PreviousDataSize+ = BundleDataSize
         ++NumberBundles
         Start a bundle I/O
         Wait for the bundle write operation to complete
      else
         Do not start a bundle I/O.
         Continue bundling in the current bundle.
else
   /*If the preferred bundle size has been attained...*/
   PreviousDataSize+ = BundleDataSize
   ++NumberBundles
   Start a bundle I/O
   Wait for the bundle write operation to complete
/*Pseudo-code executed periodically*/
If NumberBundles>maximum number of bundles in history statistics then
   PreviousDataSize/ = 2
   StartTime = (StartTime + CurrentTime)/2
   BundleTimeouts/ = 2
   NumberBundles/ = 2
/*End pseudo-code*/
```

While this invention has been described with respect to the preferred and alternative embodiments, it will be understood by those skilled in the art that various changes in detail may be made therein without departing from the spirit, scope, and teaching of the invention.

What is claimed is:

1. A method for bundling journal records, comprising:
   starting a timer to expire at a predetermined maximum time-to-wait;
   accumulating journal records in a bundle; and
   dynamically adjusting a number-of-journal-records accumulated in the bundle and transmitted to a journal based on an adjustable preferred-bundle-size and the timer, wherein the adjustable preferred-bundle-size is determined based on an average bundle-size over a history interval.

2. The method of claim 1, wherein the dynamically adjusting step further comprises:
   adjusting the number-of-journal-records accumulated in a bundle downward in direct proportion to a number-of-time-outs that occurred while waiting for more journal records to arrive, wherein a time-out occurs when the timer expires.

3. The method of claim 1, wherein the dynamically adjusting step further comprises:
   calculating the average bundle-size from history statistics.

4. The method of claim 3, wherein the dynamically adjusting step further comprises:
   saving in the history statistics the number-of-time-outs that occurred during the history interval.

5. The method of claim 3, wherein the dynamically adjusting step further comprises:
   saving in the history statistics a number-of-bundles that were written to the journal during the history interval.

6. The method of claim 3, wherein the dynamically adjusting step further comprises:
   saving in the history statistics a data size of data that was written in the bundles during the history interval.

7. The method of claim 1, further comprising:
   periodically discarding a portion of the history statistics.

8. The method of claim 7, wherein the portion is one half.

9. The method of claim 7, wherein the periodically discarding step defines a start of a new history interval.

10. A program product, comprising:
    a journal controller that starts a timer to expire at a predetermined maximum time-to-wait, accumulates journal records in a bundle, and dynamically adjusts a number-of-journal-records accumulated in the bundle and transmitted to a journal based on an adjustable preferred-bundle-size and the timer, wherein the adjustable preferred-bundle-size is determined based on an average bundle-size over a history interval; and
    signal-bearing media bearing the journal controller.

11. The program product of claim 10, wherein the journal controller further adjusts the number-of-journal-records accumulated in a bundle downward in direct proportion to a number-of-time-outs that occurred while waiting for more journal records to arrive, wherein a time-out occurs when the timer expires.

12. The program product of claim 10, wherein the journal controller further calculates the average bundle-size from history statistics.

13. The program product of claim 12, wherein the journal controller further saves in the history statistics the number-of-time-outs that occurred during the history interval.

14. The program product of claim 12, wherein the journal controller further saves in the history statistics a number-of-bundles that were written to the journal during the history interval.

15. The program product of claim 12, wherein the journal controller further saves in the history statistics a data size of data that was written in the bundles during the history interval.

16. The program product of claim 10, wherein the journal controller further periodically discards a portion of the history statistics.

17. The program product of claim 16, wherein the portion is one half.

18. The program product of claim 16, wherein the journal controller periodically discarding a portion of the history statistics defines a start of a new history interval.

19. An apparatus, comprising:

a processor;

memory coupled to the processor;

a timer coupled to the processor; and a journal controller residing in the memory and comprising instructions that execute on the processor, wherein the journal controller starts the timer to expire at a predetermined maximum time-to-wait, accumulates journal records in a bundle, and dynamically adjusts a number-of-journal-records accumulated in the bundle and transmitted to a journal based on an adjustable preferred-bundle-size and the timer, wherein the adjustable preferred-bundle-size is determined based on an average bundle-size over a history interval.

20. The apparatus of claim 19, wherein the journal controller further adjusts the number-of-journal-records accumulated in a bundle downward in direct proportion to a number-of-time-outs that occurred while waiting for more journal records to arrive, wherein a time-out occurs when the timer expires.

21. The apparatus of claim 19, wherein the journal controller further calculates the average bundle-size from history statistics.

22. The apparatus of claim 21, wherein the journal controller further saves in the history statistics the number-of-time-outs that occurred during the history interval.

23. The apparatus of claim 21, wherein the journal controller further saves in the history statistics a number-of-bundles that were written to the journal during the history interval.

24. The apparatus of claim 21, wherein the journal controller further saves in the history statistics a data size of data that was written in the bundles during the history interval.

25. The apparatus of claim 19, wherein the journal controller further periodically discards a portion of the history statistics.

26. The apparatus of claim 25, wherein the portion is one half.

27. The apparatus of claim 25, wherein the journal controller periodically discarding a portion of the history statistics defines a start of a new history interval.

* * * * *